Figure 1:
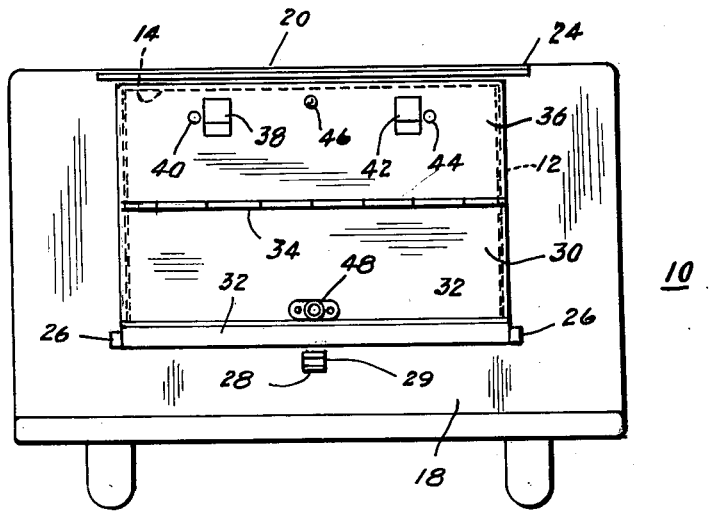

Nov. 13, 1962  E. J. ANDERSON  3,063,747
TAIL GATES FOR VEHICLES

Filed April 13, 1961  2 Sheets-Sheet 1

INVENTOR.
EARL J. ANDERSON
BY Ray Eilers
ATT'Y.

Nov. 13, 1962 E. J. ANDERSON 3,063,747
TAIL GATES FOR VEHICLES
Filed April 13, 1961 2 Sheets-Sheet 2
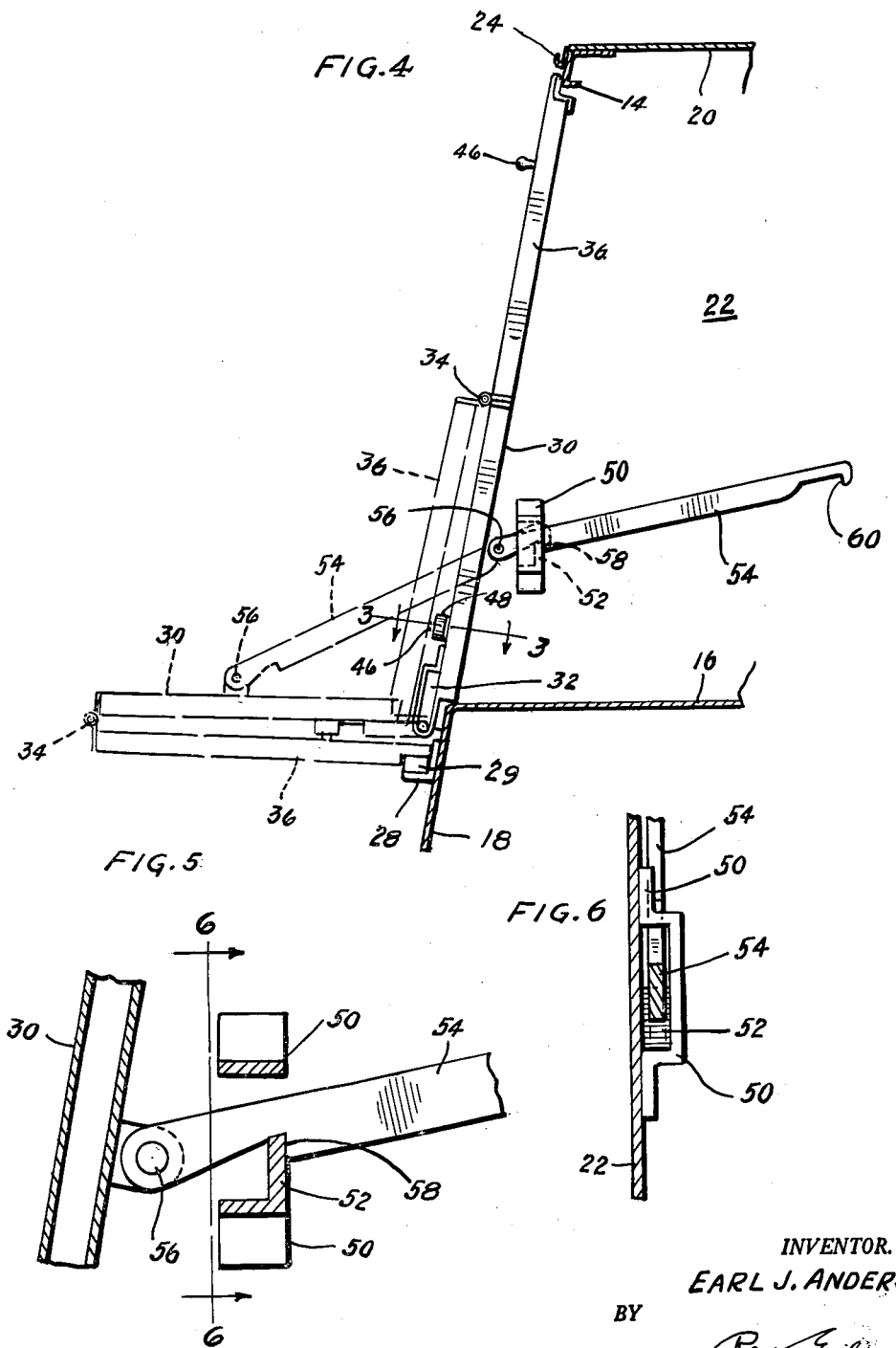
INVENTOR.
EARL J. ANDERSEN
BY
Rey Eilers
ATT'Y.

United States Patent Office 3,063,747
Patented Nov. 13, 1962

3,063,747
TAIL GATES FOR VEHICLES
Earl J. Anderson, 2 Stoneleigh Towers, Olivette, Mo.
Filed Apr. 13, 1961, Ser. No. 102,864
15 Claims. (Cl. 296—57)

This invention relates to improvements in vehicles. More particularly, this invention relates to improvements in tail gates for vehicles.

It is, therefore, an object of the present invention to provide an improved tail gate for a vehicle.

Where a vehicle has an opening which can be closed by a tail gate, that tail gate usually includes an upper panel which is pivotally mounted adjacent the upper edge of that opening and a lower panel which is pivotally mounted adjacent the lower edge of that opening. The lower edge of the upper panel and the upper edge of the lower panel are formed so they can engage and abut each other to exclude rain, snow, dust and the like; and latches are usually provided which extend outwardly from the lower panel to engage abutments adjacent the sides of the opening and thereby hold that lower panel in closed position. Also, a lock is usually mounted in the upper or lower panel to releasably lock the lower edge of the upper panel to the upper edge of the lower panel. In addition, links are usually provided to hold the lower panel in horizontal position whenever that lower panel is moved out of its closed position. Such tail gates are quite usable, but the upper panels of those tail gates make it difficult for a person to work adjacent the opening in a vehicle without occasionally bumping his head on the upper panel. It would be desirable to provide a tail gate for a vehicle which would not expose a person to the risk of bumping his head as he worked adjacent the opening in that vehicle. The present invention provides such a tail gate; and it is, therefore, an object of the present invention to provide a tail gate for a vehicle which will not expose a person to the risk of bumping his head as he works adjacent the opening in that vehicle.

The tail gate provided by the present invention has a lower panel which is pivotally mounted adjacent the lower edge of the opening in the vehicle; and it has an upper panel which has the lower edge thereof pivotally secured to the upper edge of the lower panel. Whenever access is to be had to the upper part of the opening in the vehicle, the lower panel will be left in closed position but the upper panel will be rotated down until it is in face-to-face relation with the lower panel; and at such time, a person can work freely adjacent the opening in the vehicle without any risk of bumping his head. It is, therefore, an object of the present invention to provide a tail gate which has an upper panel that has the lower edge thereof pivotally secured to the upper edge of the lower panel and which can be rotated down into face-to-face relation with that lower panel.

Whenever access is to be had to the entire opening in the vehicle, the upper panel will be rotated down until it is in face-to-face relation with the lower panel; and then both the upper panel and the lower panel will be rotated downwardly into a horizontal position. At such time, a person can work freely adjacent the opening in the vehicle without any risk of bumping his head. It is, therefore, an object of the present invention to provide a tail gate which has an upper panel that has the lower edge thereof pivotally secured to the upper edge of the lower panel and which has the lower edge of the lower panel thereof pivotally mounted adjacent the lower end of the opening, and wherein the upper panel can be rotated down into face-to-face relation with the lower panel and wherein both panels can then be rotated down into horizontal position.

Whenever both the upper and lower panels of the tail gate provided by the present invention are rotated down into horizontal position, the free edge of the upper panel will suitably rest upon a bracket which is disposed below the level of the lower edge of the lower panel. At such time, the hinged edge of the upper panel will be supported by the free edge of the lower panel, and the free edge of the upper panel will be supported by the bracket; and the upper panel will be out of the way, will largely be out of sight, and will be protected against marring or injuring. It is, therefore, an object of the present invention to provide a tail gate wherein the hinged edge of the upper panel is supported by the free edge of the lower panel and wherein the free edge of that upper panel is supported by a bracket, below the level of the lower edge of that lower panel, whenever both that upper and lower panel are rotated to horizontal position.

The lower panel of the tail gate provided by the present invention is equipped with positive-acting latches that automatically hold that lower panel in closed position whenever that lower panel is moved to closed position. Those latches are elongated, they are held in register with stops, and each of them has one end thereof pivotally secured to the lower panel of the tail gate. Whenever that lower panel is moved to closed position, those latches will respond to gravity and automatically move into holding engagement with those stops. It is, therefore, an object of the present invention to provide latches which are elongated, which are held in register with stops, which have their outer ends pivotally secured to the lower panel of a tail gate, and which automatically move into holding engagement with those stops whenever that lower panel is moved into closed position.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

Figure 2:
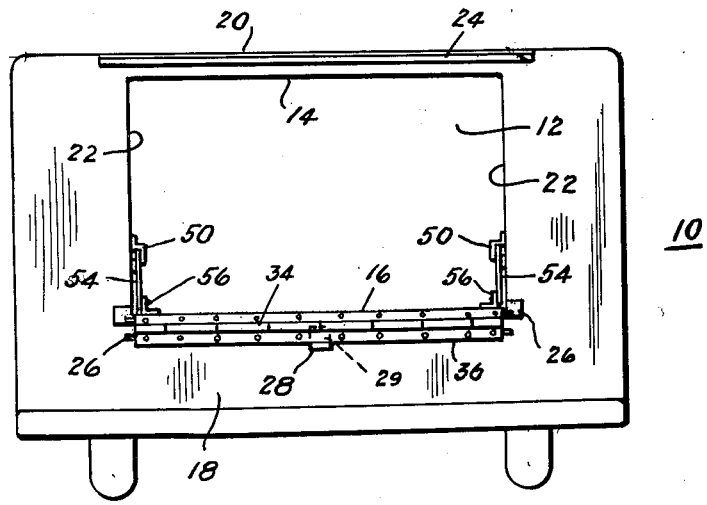
Figure 3:
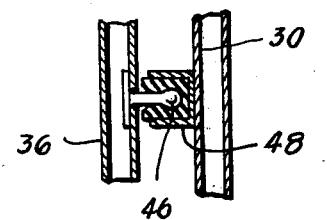

In the drawing,

FIG. 1 is a rear elevational view of a truck body that is equipped with a tail gate which is made in accordance with the principles and teachings of the present invention, FIG. 2 is a view which is similar to that shown in FIG. 1, but it shows the panels of the tail gate in horizontal position, FIG. 3 is a broken, sectional view, on an enlarged scale, through the upper and lower panels of the tail gate, and it is taken along the plane indicated by the line 3—3 in FIG. 4, FIG. 4 is a broken, sectional view, on a large scale, through the rear portion of the truck body of FIG. 1, and it shows the closed position of the panels of the tail gate by solid lines, shows the open position of the upper panel by dotted lines, and shows the horizontal position of both panels by dotted lines, FIG. 5 is a broken, sectional view, on a still larger scale, through the lower panel of the tail gate and through one of the guiding and holding brackets adjacent that lower panel, and it shows one of the latches for that lower panel in elevation, and FIG. 6 is a sectional view through the structure shown in FIG. 5, and it is taken along the plane indicated by the line 6—6 in FIG. 5.

Referring to the drawing in detail, the numeral 10 generally denotes a truck body which has an opening 12 in the rear thereof; and that opening is rectangular in elevation, as shown particularly by FIG. 2. A horizontally-directed formed member 14 defines the upper edge of the opening 12, a floor 16 defines the lower edge of that opening, and side walls 22 define the side edges of that opening. A skirt 18 depends downwardly and rearwardly from the rear edge of the floor 16, as shown particularly by FIG. 4. The structural members that define and form the opening 12 and the skirt 18 are of standard and usual construction and are not, per se, parts of the present invention. A roof 20 of standard and usual design is provided for the truck body 10, and a gutter 24 of standard and usual design is provided adjacent the rear edge of that roof.

The numeral 26 denotes pivot blocks that are secured to the truck body 10 adjacent the lower edge of the opening 12; and those pivot blocks are sturdy and will be able to provide full support for the tail gate provided by the present invention. An angle 28 is secured to the skirt 18 of the truck body 10 at a point approximately mid-way between the pivot blocks 26. That angle is short, it has its vertical arm secured to the skirt 18, and it has its horizontal arm extending rearwardly from that skirt, as shown particularly by FIG. 4. A pad 29 of resilient, weather-resistant material, such as rubber, is fixedly secured to the upper face of the horizontal arm of the angle 28.

The tail gate provided by the present invention includes a lower panel 30 and an upper panel 36. As indicated particularly by FIG. 3, those panels are hollow and have inner and outer walls. A formed member 32, that supports an elongated pivot, is secured to the outer wall of the lower panel 30 of the tail gate; and that formed member fixedly secures that pivot to that panel and helps stiffen that panel. The ends of the elongated pivot are rotatably held by the pivot blocks 26; and hence the lower panel 30 can rotate freely relative to the truck body 10.

An elongated hinge 34 is provided at the upper edge of the lower panel 30; and that hinge rotatably secures the lower edge of the upper panel 36 to the upper edge of the lower panel 30. As a result, the upper panel 36 can rotate relative to the lower panel 30 about the elongated hinge 34, and both panels can rotate relative to the truck body 10 about the elongated pivot held by the formed member 32.

Latches 38 and 42 releasably secure the upper edge of the upper panel 36 to the horizontally-directed formed member 14 which defines the upper edge of the opening 12. Key-operated locks 40 and 44, respectively, are associated with the latch 38 and the latch 42. Authorized personnel will have keys that can operate the locks 40 and 44, and hence such personnel will be able to actuate the latches 38 and 42. However, unauthorized persons will be unable to operate the locks 40 and 44, and thus will be unable to actuate the latches 38 and 42. The latches 38 and 42 and the locks 40 and 44 are of standard and usual design and are not, per se, parts of the present invention.

The numeral 46 denotes a headed pin which is secured to the outer wall of the upper panel 36 of the tail gate at a point adjacent the upper edge of that upper panel. That headed pin has a shank with a diameter which is smaller than the diameter of the head of that pin. That pin extends outwardly from the plane defined by the outer wall of the upper panel 36 of the tail gate at an angle of ninety degrees; and the head of that pin can be accommodated by an annulus of yieldable material within a socket 48 which is carried by the outer wall of the lower panel 30 of the tail gate. That socket is mounted adjacent the upper edge of the formed member 32 and is disposed in vertical registry with the headed pin 46. The yieldable annulus within the socket 48 is formed so the head of the headed pin 46 must distend that yieldable annulus as that head enters the socket 48. The distension of that yieldable annulus will provide a holding force on the head of the headed pin 46 which will prevent accidental separation of the upper panel 36 of the tail gate from the lower panel 30 of that tail gate, whenever the head of that headed pin has been telescoped into the socket 48.

The numeral 50 denotes U-shaped brackets which are secured to the side walls 22 of the truck body 10; and each of those U-shaped brackets is provided with a lip 52 which extends upwardly from the lower arm of that U-shaped bracket. Elongated latches 54 are rotatably secured to pivots 56; and those pivots are suitably secured to the inner wall of the lower panel 30 of the tail gate. Each of those latches has a notch 58 adjacent the pivot 56 and has a second notch 60 adjacent the free end thereof. Each of those notches is adapted to engage and be held by the lip 52 on the U-shaped bracket with which that latch is associated.

The latches 54 extend through the openings which are defined by the side walls 22 and the U-shaped brackets 50; and normally the notches 58 engage the lips 52 of the U-shaped brackets 50 and hold the lower panel 30 of the tail gate in the closed position shown by solid lines in FIG. 4. At such time, flanges on the side edges of that lower panel will project outwardly beyond the side walls 22 of the truck body 10. However, it is possible to raise upwardly on the free ends of the latches 54, until the notches 58 are clear of the lips 52, and then apply a rearward pull to those latches or to the lower panel 30. Such a pull will cause that lower panel to rotate in the counter clockwise direction in FIG. 4 about the pivot blocks 26. As that lower panel approaches the horizontal position shown by dotted lines in FIG. 4, the notches 60 in the latches 54 will approach the lips 52 of the U-shaped brackets 50. When those notches telescope over the lips 52 of those U-shaped brackets, the latches 54 will lock the lower panel 30 of the tail gate against rotation downwardly below that horizontal position.

In their normal position, the lower panel 30 and the upper panel 36 will be closed, and will be in the position shown by solid lines in FIG. 4. At such time, a flange on the side and top edges of the upper panel 36 will project outwardly beyond the side walls 22, and above the upper edge of the opening 12, of the truck body 10. Also at such time the notches 58 in the latches 54 will engage the lips 52 on the U-shaped brackets 50 and will fixedly hold the lower panel 30 against movement outwardly and away from the rear wall of the truck body 10. This means that the panel 30 will act through the elongated hinge 34 to hold the lower edge of the upper panel 36 of the tail gate against movement outwardly and away from the rear of the truck body 10. Further at such time, the latches 38 and 42 will engage the horizontally-directed formed member 14 adjacent the upper edge of the opening 12 and will hold the upper edge of the upper panel 36 of the tail gate against movement outwardly and away from the rear face of the truck body 10.

In the event an authorized person desires access to the upper part of the interior of the truck body 10, he can insert a key in the locks 40 and 44 and thereby free the latches 38 and 42 for actuation. Appropriate actuation of those latches will make it possible to rotate the upper panel 36 of the tail gate outwardly and away from the rear face of the truck body 10. Such rotation will be guided by the elongated hinge 34, and it will cause that upper panel to rotate to the generally vertical position shown by dotted lines in FIG. 4. As that upper portion 36 approaches that generally vertical position, the head on the headed pin 46 will telescope into the socket 48 and distend the yieldable annulus within that socket. As indicated previously, that distension will hold the upper panel 36 of the tail gate against accidental separation from the lower panel 30 of that tail gate. At this time, the notches 58 of the latches 54 will be in engagement with the lips 52 of the U-shaped brackets 50, and will solidly hold the lower panel 30 in the solid line position shown by FIG. 4; and the head of the headed pin 46 will coact with the yieldable annulus within the socket 48 to firmly hold the upper panel 36 of the tail gate in the generally vertical position shown by dotted lines in FIG. 4.

If that authorized person desires access to the entire opening 12, he need only raise upwardly on the free ends of the latches 54 until the notches 58 clear the lips 52 of the U-shaped brackets 50. Thereupon, a rearward force applied to the latches 54 or to the lower panel 30 of the tail gate will cause that lower panel to rotate in the counter clockwise direction about the pivot blocks 26. The upper panel 36 will rotate as a unit with the lower panel 30; and as the lower panel 30 approaches the horizontal position shown by dotted lines in FIG. 4, the flange adjacent the free edge of the upper panel 36 will move into engagement with the pad 29 of resilient material which is secured to the horizontal arm of the angle 28. That pad will support the free edge of the upper panel 36 of the tail gate but will not mar or scratch the paint on that free edge. Further, it is the inner face of the flange which engages the pad 29; and hence that pad will never touch the outer face of that flange. The headed pin 46 will coact with the yieldable annulus within the sleeve 48 to maintain the upper panel 36 in assembled relation with the lower panel 30 as those panels are rotated toward the horizontal position shown by FIG. 4.

As the lower panel 30 of the tail gate moves into the horizontal position shown by dotted lines in FIG. 4, the notches 60 adjacent the free ends of the latches 54 will engage the lips 52 on the U-shaped brackets 50 and thereby prevent further counter clockwise rotation of the lower panel 30 and of the upper panel 36 of the tail gate. At this time the latches 54 will provide full support for the lower panel 30 of the tail gate, and that lower panel will serve as a solid extension of the floor 16 of the truck body 10.

To return the lower panel 30 of the tail gate to the generally vertical position shown by solid lines in FIG. 4, it is only necessary to apply an upward force to the free edge of that lower panel; because the notches 60 have inclined edges at the left-hand ends thereof. Those inclined edges will serve as inclined planes and will coact with the lips 52 on the U-shaped brackets 50 to automatically ease the latches 54 upwardly and above the lips 52 whenever upward forces are applied to the free edge of the lower panel 30. As the lower panel 30 of the tail gate reaches the solid line position shown by FIG. 4, the notches 58 will pass inwardly beyond the inner faces of the lips 52 on the U-shaped brackets 50 and will then automatically fall downwardly into latching position. The centers of gravity of the latches 54 will, at this time, be disposed considerable distances to the right of the pivots 56; and the weights of those latches will promptly and effectively force the notches 58 down into blocking engagement with the lips 52 on the U-shaped brackets 50. In this way, the application of raising forces to the free edge of the lower panel 30 of the tail gate will automatically cause the latches 54 to rise upwardly out of engagement with the lips 52 on the U-shaped brackets 50, and will then permit the weights of those latches to automatically lock those latches in engagement with the lips 52 on the U-shaped brackets 50 as the lower panel 30 of the tail gate reaches its closed position.

Once the lower panel 30 of the tail gate has reached its closed position, and has been locked in that position by the engagement of the notches 58 on the latches 54 with the lips 52 of the U-shaped brackets 50, an outward and upward force can be applied to the free edge of the upper panel 36 of that tail gate. That outward and upward force will withdraw the head of the headed pin 46 from the yieldable annulus within the socket 48; and thereafter the upper panel 36 of the tail gate can be freely rotated to the solid line position shown by FIG. 4. When that upper panel reaches that solid line position, it can be locked in that position by appropriate actuation of the latches 38 and 42.

The rear of the truck body inclines upwardly and forwardly from the skirt 18, and such inclination is desirable because it enables the centers of gravity of the two panels of the tail gate to hold those panels in closed position whenever those panels are close to the position shown by solid lines in FIG. 4. This means that the authorized person can actuate the latches 38 and 42 without any need of holding the upper panel 30 in position.

Whereas the drawing and accompanying description have shown and described a preferred embodiment of the present invention it should be apparent to those skilled in the art that various changes may be made in the form of the invention without affecting the scope thereof.

What I claim is:

1. In a vehicle which has an opening therein and which has a tail gate to selectively close that opening, a lower panel, a pivot that rotatably secures the lower edge of said lower panel to said vehicle adjacent the lower edge of said opening, an upper panel, a second pivot that rotatably secures the lower edge of said upper panel to the upper edge of said lower panel, a latch and a bracket that selectively hold said lower panel in closed position and that selectively hold said lower panel in horizontal position, said bracket being U-shaped and having a lip that extends upwardly from the lower arm thereof, said latch extending through the space defined by said U-shaped bracket and having notches therein which are engageable with said lip on said U-shaped bracket, said latch being rotatably secured to said lower panel by a third pivot, one of said notches of said latch being adjacent said third pivot, another of said notches of said latch being adjacent the free end of said latch, said other notch having that end thereof which is spaced from said free end of said latch inclined to the axis of said latch to serve as an inclined plane, a second latch that is carried by said upper panel and that is usable to hold said upper panel in closed position, a headed pin carried by said upper panel, a socket that is carried by said lower panel and that holds a yieldable annulus in vertical registry with said headed pin, and an angle that is secured to said vehicle below the level of the first said pivot, said upper and lower panels normally being in closed position and said one notch of the first said latch normally engaging said lip on said U-shaped bracket to hold said lower panel in closed position and said second latch normally holding said upper panel in closed position, said second latch being adapted to free said upper panel for rotation outwardly and away from said opening and downwardly and toward said lower panel, said headed pin being adapted to enter and to distend said yieldable annulus in said socket and thereby hold said upper panel in face-to-face relation with said lower panel, said one notch of the first said latch being adapted to be moved out of engagement with said lip on said U-shaped bracket to free said lower panel for rotation outwardly and away from said opening and downwardly and toward a horizontal position, said angle receiving and holding the inner face of the free edge of said upper panel whenever said panels are in said horizontal position, said other notch of the first said latch engaging said lip on said U-shaped bracket to hold said free edge of said lower panel against rotation downwardly below said horizontal position whenever said panels are in said horizontal position, said upper panel being disposed below and being partially concealed by said lower panel whenever said panels are in said horizontal position, said end of said other notch of the first said latch responding to upward forces applied to the free edge of said lower panel to raise the first said latch up and out of register with said lip on said U-shaped bracket and thereby permit said lower panel to be rotated upwardly and inwardly to closed position, said one notch of the first said latch automatically engaging and locking itself in holding relation with said lip on said U-shaped bracket whenever said lower panel reaches closed position.

2. In a vehicle which has an opening therein and which has a tail gate to selectively close that opening, a lower panel, a pivot that rotatably secures the lower edge of said lower panel to said vehicle adjacent the lower edge of said opening, an upper panel, a second pivot that rotatably secures the lower edge of said upper panel to the upper edge of said lower panel, a latch and a bracket that selectively hold said lower panel in closed position and that selectively hold said lower panel in horizontal position, said bracket being U-shaped and having a lip that extends upwardly from the lower arm thereof, said latch extending through the space defined by said U-shaped bracket and having notches therein which are engageable with said lip on said U-shaped bracket, said latch being rotatably secured to said lower panel by a third pivot, one of said notches of said latch being adjacent said third pivot, another of said notches of said latch being adjacent the free end of said latch, said other notch having that end thereof which is spaced from said free end of said latch inclined to the axis of said latch to serve as an inclined plane, a second latch that is carried by said upper panel and that is usable to hold said upper panel in closed position, and an angle that is secured to said vehicle below the level of the first said pivot, said upper and lower panels normally being in closed position and said one notch of the first said latch normally engaging said lip on said U-shaped bracket to hold said lower panel in closed position and said second latch normally holding said upper panel in closed position, said second latch being adapted to free said upper panel for rotation outwardly and away from said opening and downwardly and toward said lower panel, said one notch of the first said latch being adapted to be moved out of engagement with said lip on said U-shaped bracket to free said lower panel for rotation outwardly and away from said opening and downwardly and toward a horizontal position, said angle receiving and holding the inner face of the free edge of said upper panel whenever said panels are in said horizontal position, said other notch of the first said latch engaging said lip on said U-shaped bracket to hold said free edge of said lower panel against rotation downwardly below said horizontal position whenever said panels are in said horizontal position, said upper panel being disposed below and being partially concealed by said lower panel whenever said panels are in said horizontal position, said end of said other notch of the first said latch responding to upward forces applied to the free edge of said lower panel to raise the first said latch up and out of register with said lip on said U-shaped bracket and thereby permit said lower panel to be rotated upwardly and inwardly to closed position, said one notch of the first said latch automatically engaging and locking itself in holding relation with said lip on said U-shaped bracket whenever said lower panel reaches closed position.

3. In a vehicle which has an opening therein and which has a tail gate to selectively close that opening, a lower panel, a pivot that rotatably secures the lower edge of said lower panel to said vehicle adjacent the lower edge of said opening, an upper panel, a second pivot that rotatably secures the lower edge of said upper panel to the upper edge of said lower panel, a latch and a bracket that selectively hold said lower panel in closed position and that selectively hold said lower panel in horizontal position, said bracket being U-shaped and having a lip that extends upwardly from the lower arm thereof, said latch extending through the space defined by said U-shaped bracket and having notches therein which are engageable with said lip on said U-shaped bracket, said latch being rotatably secured to said lower panel by a third pivot, one of said notches of said latch being adjacent said third pivot, another of said notches of said latch being adjacent the free end of said latch, a second latch that is carried by said upper panel and that is usable to hold said upper panel in closed position, a headed pin carried by said upper panel, a socket that is carried by said lower panel and that holds a yieldable annulus in vertical registry with said headed pin, and an angle that is secured to said vehicle below the level of the first said pivot, said upper and lower panels normally being in closed position and said one notch of the first said latch normally engaging said lip on said U-shaped bracket to hold said lower panel in closed position and said second latch normally holding said upper panel in closed position, said second latch being adapted to free said upper panel for rotation outwardly and away from said opening and downwardly and toward said lower panel, said headed pin being adapted to enter and to distend said yieldable annulus in said socket and thereby hold said upper panel in face-to-face relation with said lower panel, said one notch of the first said latch being adapted to be moved out of engagement with said lip on said U-shaped bracket to free said lower panel for rotation outwardly and away from said opening and downwardly and toward a horizontal position, said angle receiving and holding the inner face of the free edge of said upper panel whenever said panels are in said horizontal position, said other notch of the first said latch engaging said lip on said U-shaped bracket to hold said free edge of said lower panel against rotation downwardly below said horizontal position whenever said panels are in said horizontal position, said upper panel being disposed below and being partially concealed by said lower panel whenever said panels are in said horizontal position.

4. In a vehicle which has an opening therein and which has a tail gate to selectively close that opening, a lower panel, a pivot that rotatably secures the lower edge of said lower panel to said vehicle adjacent the lower edge of said opening, an upper panel, a second pivot that rotatably secures the lower edge of said upper panel to the upper edge of said lower panel, a latch and a bracket that selectively hold said lower panel in closed position and that selectively hold said lower panel in horizontal position, a second latch that is carried by said upper panel and that is usable to hold said upper panel in closed position, a headed pin carried by said upper panel, a socket that is carried by said lower panel and that holds a yieldable annulus in vertical registry with said headed pin, and an angle that is secured to said vehicle below the level of the first said pivot, the first said latch normally coacting with said bracket to hold said lower panel in closed position, said second latch normally holding said upper panel in closed position, said second latch being adapted to free said upper panel for rotation outwardly and away from said opening and downwardly and toward said lower panel, said headed pin being adapted to enter and to distend said yieldable annulus in said socket and thereby hold said upper panel in face-to-face relation with said lower panel, the first said latch and said bracket being adapted to free said lower panel for rotation outwardly and away from said opening and downwardly and toward a horizontal position, said angle receiving and holding the inner face of the free edge of said upper panel whenever said panels are in said horizontal position, said upper panel being disposed below and being partially concealed by said lower panel whenever said panels are in said horizontal position.

5. In a vehicle which has an opening therein and which has a tail gate to selectively close that opening, a lower panel, a pivot that rotatably secures the lower edge of said lower panel to said vehicle adjacent the lower edge of said opening, an upper panel, a second pivot that rotatably secures the lower edge of said upper panel to the upper edge of said lower panel and that permits said upper panel to rotate toward said lower panel, a latch and a bracket that selectively hold said lower panel in closed position and that selectively hold said lower panel in horizontal position, a second latch that is carried by said upper panel and that is usable to hold said upper panel in closed position, the first said latch normally coacting with said bracket to hold said lower panel in closed position, said second latch normally holding said upper panel in closed position, said second latch being adapted to free said upper panel for rotation outwardly and away from said opening and downwardly and toward said lower panel, the first said latch and said bracket being adapted to free said lower panel for rotation outwardly and away from said opening and downwardly and toward a horizontal position, said upper panel being disposed below and being partially concealed by said lower panel whenever said panels are in said horizontal position.

6. In a vehicle which has an opening therein and which has a tail gate to selectively close that opening, a lower panel that has the lower edge thereof pivotally secured to said vehicle adjacent the lower edge of said opening, an upper panel that has the lower edge thereof pivotally secured to the upper edge of said lower panel to enable said upper panel to rotate into face-to-face relation with said lower panel, and a latch that normally holds said lower panel in closed position but that can permit said lower panel to rotate outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position, said lower panel overlying and partially concealing said upper panel after said lower panel has been rotated outwardly and downwardly from said closed position.

7. In a vehicle which has an opening therein and which has a tail gate to selectively close that opening, a lower panel that is pivotally secured to said vehicle adjacent said opening and an upper panel that is pivotally secured to said lower panel to enable said upper panel to rotate into face-to-face relation with said lower panel, said lower panel normally being in closed position but being rotatable outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position.

8. In a vehicle which has an opening therein and which has a tail gate to selectively close that opening, a lower panel that has the lower edge thereof pivotally secured to said vehicle adjacent the lower portion of said opening, an upper panel that has the lower edge thereof pivotally secured to said lower panel to enable said upper panel to rotate into face-to-face relation with said lower panel, and a latch that normally holds said lower panel in closed position but that can permit said lower panel to rotate outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position.

9. In a vehicle which has an opening therein and which has a tail gate to selectively close that opening, a lower panel that is pivotally secured to said vehicle adjacent said opening and an upper panel that is pivotally secured to said lower panel, said lower panel normally being in closed position but being rotatable outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position, and members that interact to hold said upper and lower panels for rotation as a unit.

10. In a vehicle which has an opening therein and which has a tail gate to selectively close that opening, a lower panel that is pivotally secured to said vehicle adjacent said opening and an upper panel that is pivotally secured to said lower panel, said lower panel normally being in closed position but being rotatable outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position, and members that interact to hold said upper and lower panels for rotation as a unit, one of said members being a yieldable annulus and the other of said members being a headed pin that can telescope into and thereby distend said yieldable annulus.

11. In a vehicle which has an opening therein and which has a tail gate to selectively close that opening, a lower panel that is pivotally secured to said vehicle adjacent said opening and an upper panel that is pivotally secured to said lower panel, said lower panel normally being in closed position but being rotatable outwardly and downwardly from said closed position, said upper panel normally being in closed position but being rotatable outwardly and downwardly into face-to-face relation with said lower panel, said upper panel being movable with said lower panel as said lower panel rotates outwardly and downwardly from said closed position, and members that interact to hold said upper and lower panels for rotation as a unit, one of said members being an unyielding projection and the other of said members being yieldable and releasably holding said projection.

12. In a vehicle which has an opening therein and which has a tail gate to selectively close that opening, a lower panel that is pivotally secured to said vehicle adjacent said opening, an upper panel that is pivotally secured to said lower panel, and a latch that can hold said lower panel in generally horizontal position, said lower panel normally being in closed position but being rotatable outwardly and downwardly from said closed position to said generally horizontal position, said upper panel normally being in closed position but being rotatable outwardly and downwardly into face-to-face relation with said lower panel, said upper panel being movable as a unit with said lower panel as said lower panel rotates outwardly and downwardly from said closed position to said generally horizontal position.

13. In a vehicle which has an opening therein and which has a tail gate to selectively close that opening, a lower panel that is pivotally secured to said vehicle adjacent said opening, an upper panel that is pivotally secured to said lower panel, and a bracket that is below the level of said lower panel, said lower panel normally being in closed position but being rotatable outwardly and downwardly from said closed position to a generally horizontal position, said upper panel normally being in closed position but being rotatable outwardly and downwardly into face-to-face relation with said lower panel, said upper panel being movable with said lower panel as said lower panel rotates outwardly and downwardly from said closed position to said generally horizontal position, said bracket underlying and supporting the free edge of said upper panel whenever said lower panel is in said generally horizontal position.

14. In a vehicle which has an opening therein and which has a tail gate to selectively close that opening, a lower panel that is pivotally secured to said vehicle adjacent said opening, an upper panel that is pivotally secured to said lower panel, and a bracket that is below the level of said lower panel, said lower panel normally being in closed position but being rotatable outwardly and downwardly from said closed position to a generally horizontal position, said upper panel normally being in closed position but being rotatable outwardly and downwardly into face-to-face relation with said lower panel, said upper panel being movable with said lower panel as said lower panel rotates outwardly and downwardly from said closed position to said generally horizontal position, said bracket underlying and supporting the free edge of said upper panel whenever said lower panel is in said generally horizontal position, and a resilient pad on said bracket, said resilient pad engaging the inner face of said upper panel whenever said lower panel is in said generally horizontal position.

15. In a vehicle which has an opening therein and which has a tail gate to selectively close that opening, a lower panel that is pivotally secured to said vehicle adjacent said opening, an upper panel that is pivotally secured to said lower panel, and a latch that can hold said lower panel in generally horizontal position, said lower panel normally being in closed position but being rotatable outwardly and downwardly from said closed position to said generally horizontal position, said upper panel normally being in closed position but being rotatable outwardly and downwardly into face-to-face relation with said lower panel, said upper panel being movable with said lower panel as said lower panel rotates outwardly and downwardly from said closed position to said generally horizontal position, said lower panel overlying and partially concealing said upper panel whenever said lower panel is in said generally horizontal position.

References Cited in the file of this patent

UNITED STATES PATENTS

| | | | |
|---|---|---|---|
| 491,617 | Wagner | Feb. 14, | 1893 |
| 622,049 | Kissinger | Mar. 28, | 1899 |
| 890,056 | Hopkins | June 9, | 1908 |
| 2,057,555 | Clark et al. | Oct. 13, | 1936 |